March 19, 1940.   J. S. ABERCROMBIE ET AL   2,194,264
MANIFOLD VALVE
Filed Dec. 27, 1937    3 Sheets-Sheet 1

INVENTOR.
J. S. ABERCROMBIE.
HERBERT ALLEN.
BY Jesse R. Stone
Lester B. Clark
ATTORNEYS.

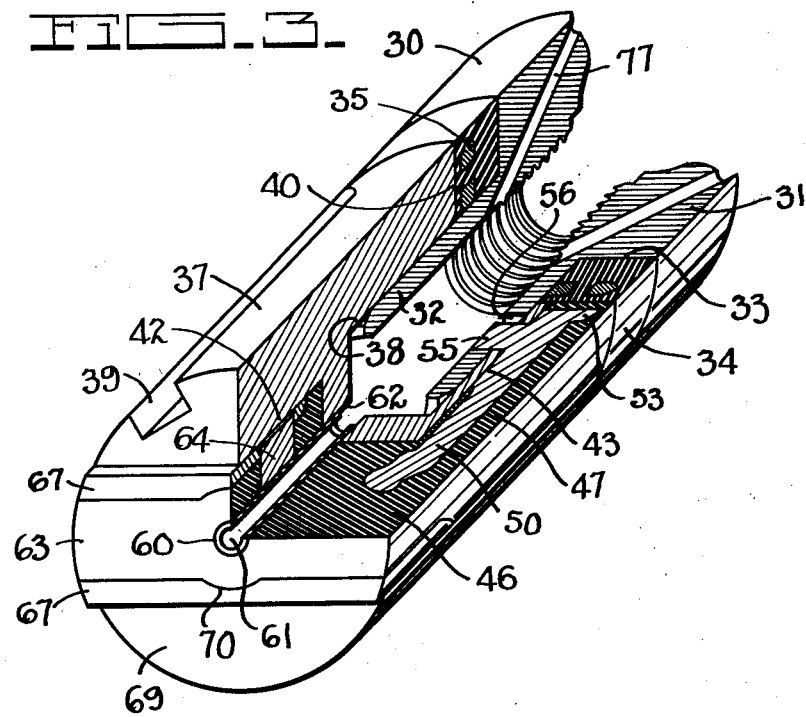
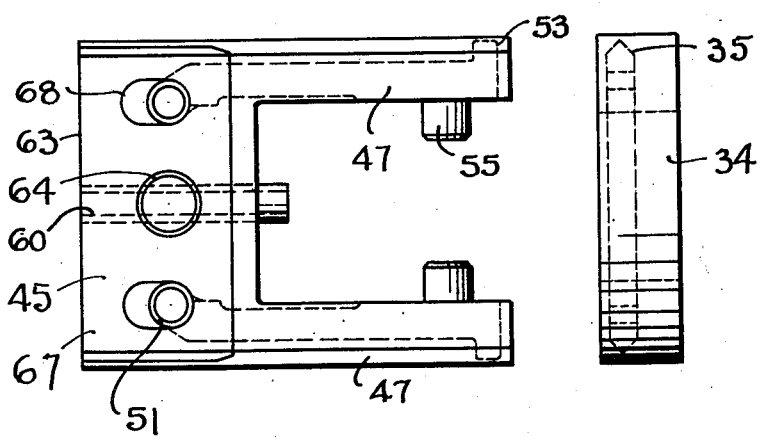

March 19, 1940.　　J. S. ABERCROMBIE ET AL　　2,194,264
MANIFOLD VALVE
Filed Dec. 27, 1937　　3 Sheets-Sheet 3

INVENTOR.
J. S. ABERCROMBIE
HERBERT ALLEN.
BY Jesse R. Stone
Lester B. Clark
ATTORNEYS.

Patented Mar. 19, 1940

2,194,264

UNITED STATES PATENT OFFICE 2,194,264

MANIFOLD VALVE

James S. Abercrombie and Herbert Allen, Houston, Tex.; said Allen assignor to said Abercrombie Application December 27, 1937, Serial No. 181,832

8 Claims. (Cl. 251—159)

The invention relates to a manifold valve which is particularly adapted for use in well drilling operations to close off enormous pressures at the well head.

With valves of this type it is necessary that a perfect seal be maintained and that an excess or surplus of sealing material be provided to compensate for wear and cutting away in event of leakage. It is, therefore, one of the objects of the invention to provide a valve member which carries an excess of packing material to flow under pressure to any point of leakage.

Still another object of the invention is to provide a valve member with a packing assembly which will flow under pressure to compensate for wear and at the same time be reenforced to withstand enormous pressures.

Still another object of the invention is to provide a seat for a valve which carries a resilient packing which can flow under pressure to compensate for wear.

Still another object of the invention is to provide a pair of cooperating seats on a valve and the valve member both of which carry a compensating packing to prevent leakage.

Still another object of the invention is to provide a valve member construction wherein a resilient packing is held thereon in position to flow under pressure.

Still another object of the invention is to provide a resilient packing for valve members through which the pressure on the face of the valve member may be equalized.

It is also an object of the invention to provide a composite valve or ram member which is made up of a plurality of packings and reenforcings therefor which are slidably arranged upon a body member.

Still another object of the invention is to provide a seat construction and the valve member to contact said seat, both of which are provided with a reserve of packing material which can flow under pressure to maintain a seal.

Other and further objects of the invention will be readily apparent when the following description is considered in connection with the accompanying drawings wherein:

Fig. 3 is a perspective view of the valve member with one quarter cut away to illustrate the arrangement of the parts.

Fig. 4 is a top plan view looking down on the packing with the annular ring portion spaced away from the main body of the packing.

Figure 1:
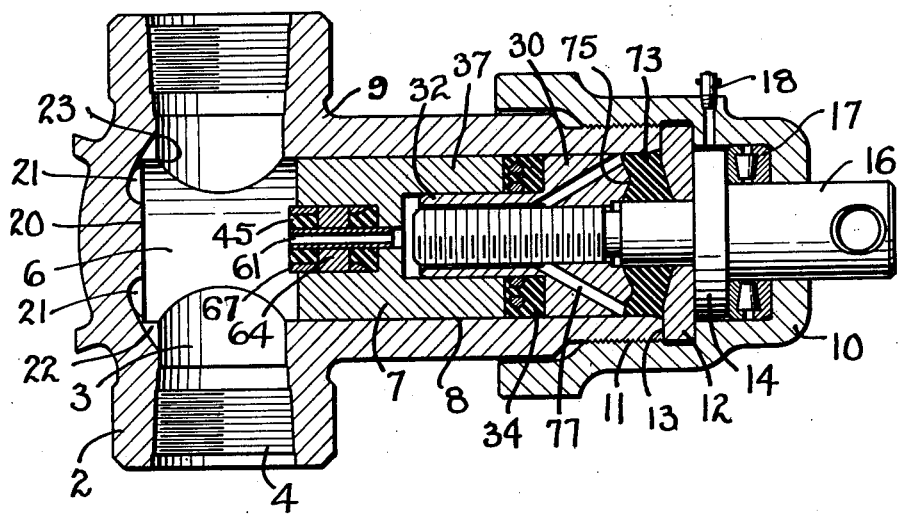
Fig. 1 is a vertical sectional view of a valve with the member in open position.

In Fig. 1 the valve housing is illustrated generally at 2 and has a vertical passage 3 therethrough. The support and other fittings for the valve may be connected at the threaded ends 4 thereof. The passage 3 is enlarged at 6 in order to provide for the transverse movement of the valve member 7, which is slidably mounted within the chamber 8, which is formed in the lateral extension 9 of the housing 2. The extension 9 is closed by a bonnet 10, which may be threaded thereon at 11 and arranged to overlie the end of the extension to protect the parts. This bonnet holds a closure plate 12 in place against the end 13 of the extension and also confines a collar 14, which is fixed on the spindle 16. An anti-friction bearing 17 is provided inside of the end of the bonnet 10 to absorb the axial thrust on the spindle which occurs upon applying pressure to the valve member 7. A connection 18 for the insertion of lubricant into the bonnet around the collar 14 has been provided.

The valve housing 2 is provided with an outstanding seat 20, which is spaced from the main portion of the body by the recess 21 above and below the seat. A restricted area or choke 22 is provided beyond the recesses 21 so that when the end of the valve member has moved into the socket portion 23 of the valve body the flow of the fluid past the seat will be restricted to the choke portions 22. The general arrangement of this choke construction is disclosed in our co-pending application Serial No. 62,267, filed February 4, 1936, for a Drilling valve, which has resulted in Patent No. 2,162,990, granted June 20, 1939.

Particular attention is directed to the valve or ram construction, as seen in perspective view in Fig. 3, wherein the valve body 30 is in the form of an enlarged cap 31 and a sleeve 32 of lesser diameter which projects forwardly therefrom. A shoulder 33 is thus provided and serves as a seat for a packing ring 34 which encircles the sleeve 32. This packing ring is arranged to seal against the inside periphery of the chamber 8 and may be provided with suitable reenforcing rings 35, so that it will resist excessive expansion.

This packing ring 34 is arranged to be expanded due to the pressure of the valve head 37, which is slidably arranged upon the sleeve 32 by the provision of the recess 38 within the head. A longitudinal groove 39 is provided to receive a retainer pin to prevent relative rotation of the valve member in the housing 9. The rear of the cap 30 carries a shoulder 40, which abuts the packing 34, so that as the body 30 of the valve is moved forward, if the head 37 contacts an object or the seat 20, then, of course, the head 37 will slide on the sleeve 32 and in this manner suitable pressure is applied to the packing 34 to maintain a seal inside of the chamber 8.

This head 37 is of peculiar construction in that it is provided with a transverse slot 42 across its forward face and this slot extends downwardly along the edges in the form of a groove 43. This groove extends to the rear end 40 of the head. The slot and groove are arranged to receive a packing assembly 45 which is best seen in Fig. 4. This packing assembly is made up of a packing body 46 which has a leg 47 extending rearwardly from each edge thereof. The body 46 fits in the slot 42 and the legs 47 fit into the groove 43. Thus the head 37 tends to completely confine this packing assembly in cooperation with the walls of the chamber 8. The packing assembly 45 is suitably reenforced by the tenons 50, one of which is provided at each side of the body 46 and extends through the leg 47. These tenons are inwardly inclined at their forward ends and provided with a transverse extension 51 which projects vertically through the body 46. The rear of each tenon has an outstanding finger 53 so as to reenforce the rear of the legs 47. In addition to this an inwardly extending lug 55 projects through an opening 56 in the sleeve 32. The opening 56 is somewhat elongated so as to allow some sliding movement of the lug 55 due to the flowing of the packing material and compression of the ring 34.

The body 56 is provided with a longitudinal passage which receives a nipple 60 to provide a bypass or equalizing passage 61 which extends into the recess 38 in the head 57. A suitable connecting passage 62 is formed in the head 37 at the base of the slot 42, as seen in Fig. 3. This nipple 60 extends to the forward face 63 of the packing assembly.

In order to hold the nipple 60 in proper alignment and to reenforce the packing body 56 a vertical stud 64 is positioned within the packing body and retains the nipple 60. The top and bottom faces of the packing body 46 are reenforced and confined by the retainer plates 67. These plates are best seen in Fig. 4 as being of a configuration to overlie a substantial part of the top and bottom faces of the body 46 and they are provided with slots 68 to receive the transverse extensions 51 on the tenons 50, and they also receive the stud 64. As seen in Fig. 3, the front face 63 of the packing and the plate 67 project in front of the face 69 of the head 37. In order to provide for an equal amount of packing material at the center and around the nipple 60 the plates 67 are grooved at 70.

Figure 2:
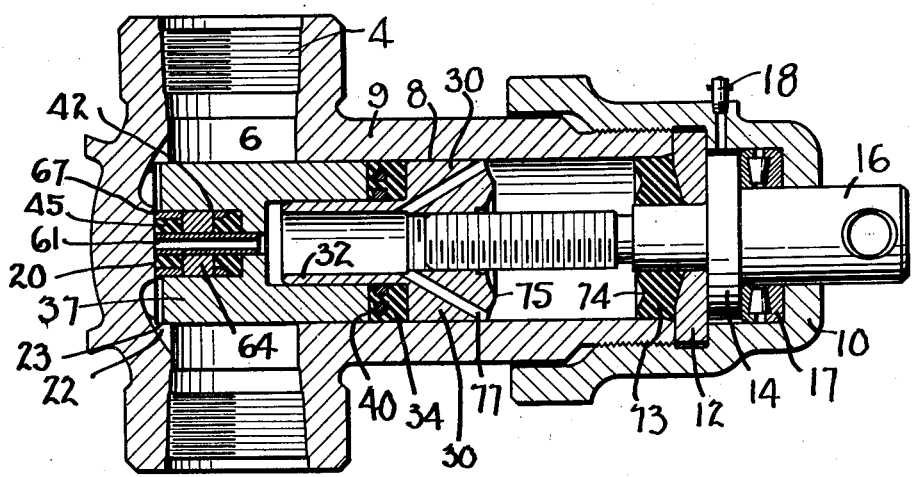
Fig. 2 is a vertical section similar to Fig. 1 but showing the valve member closed.

A seal ring 73 is positioned about the stem 16 and against the inside surface of the plate 12, as seen in Figs. 1 and 2, and this ring is formed with a recessed face 74 to receive a complementary face 75 on the rear of the cap 30. In this manner, as seen in Fig. 1, when the valve member is in open position it may be forced against the packing 73 to insure a seal and to prevent leakage under high pressure.

The cap 30 is also provided with a plurality of ports 77 which communicate with the interior of the sleeve 32 so as to form part of the arrangement for equalizing the pressure in the chamber 8 behind the valve member, so that it may be readily operated even though high pressures are being encountered.

In Fig. 2 the valve is shown in closed position with the forward face 63 of the packing and the plates 67 in engagement with the seat 20. The forward face 69 of the valve head has just moved into the recess 23 and has placed the chokes 22 into operation. Thus the volume of fluid passing the valve member as it moves onto the seat 20 is restricted and even this pressure can be equalized through the passage 61.

As pressure is applied by rotation of the spindle 16 the cap 30 is forced forwardly and transmits pressure through the packing ring 34 to the rear of the cap 37. This tends to move the cap forwardly but inasmuch as the packing assembly is restrained from further movement by its engagement with the seat 20 it seems clear that the packing will be urged forwardly between the plates 67 due to the fact that it is completely confined. The pressure thus applied will flow throughout the packing body 46 and the legs 47 as well as the ring 34 so that a uniform pressure will be applied to all of the areas inside of the valve housing and across the seat 20. In event any of the packing on the forward face 63 of the body should be worn away there will be an immediate distribution of the pressure due to the fact that the packing is capable of flowing under pressure so long as pressure is applied to the valve member by the spindle 16. If there is a wearing away of the forward portion of the packing additional material will be extruded forwardly between the plates 67 to compensate for that which has disappeared.

It seems obvious from the foregoing that the pressure is resiliently applied to the cap 37 and that due to the arrangement of the packing a uniform seal will be maintained between all of the parts and that the packing will be properly confined so that enormous pressures may be applied to it to maintain a seal.

Figure 5:
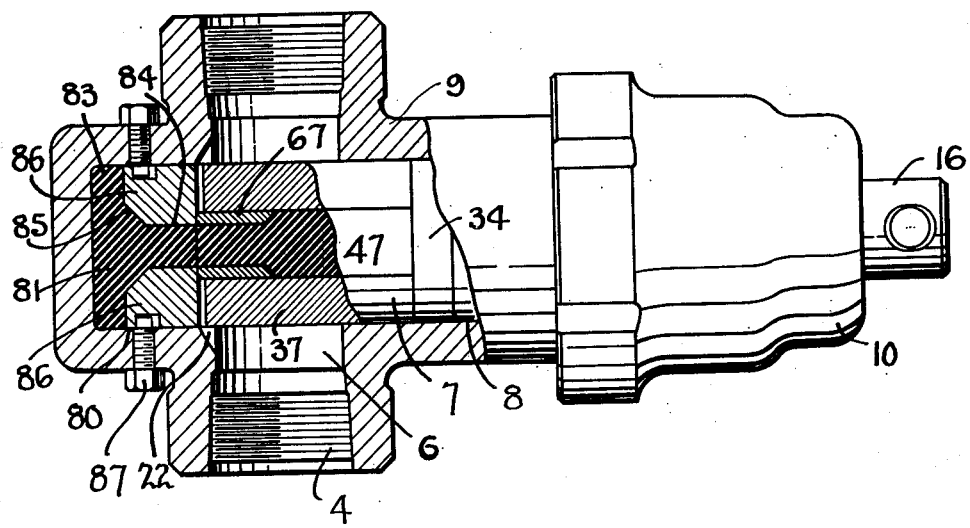
Fig. 5 is a vertical sectional view of a modified form of the valve construction wherein a compensating seat has been provided to cooperate with the valve member in providing a seal.
Figure 6:
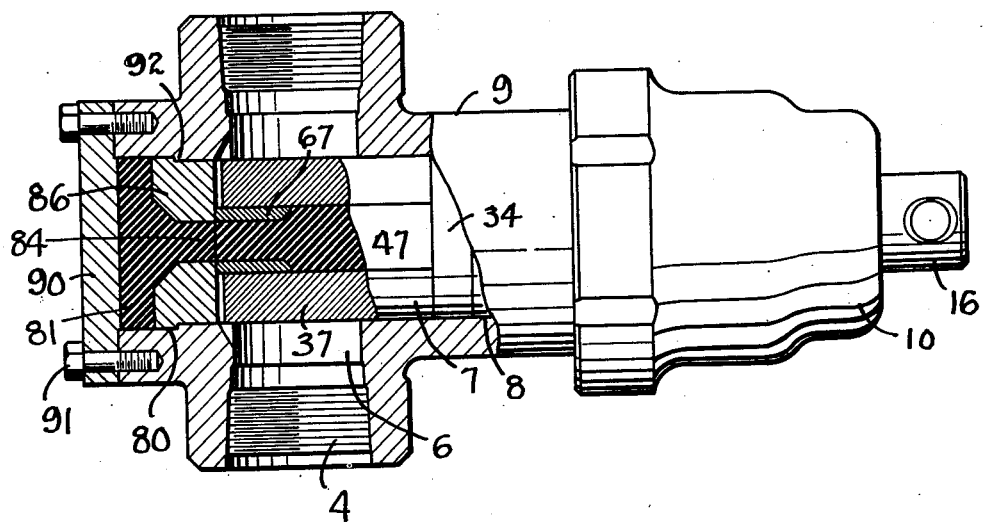
Fig. 6 is a similar view to Fig. 5 but shows a removable cap for the insertion of the compensating seat.

Figs. 5 and 6 show a slightly modified form of valve in which the same general type of construction is utilized insofar as the valve member is concerned. A particular type of valve seat has been provided in Figs. 5 and 6 however in that the valve body 2 has been arranged with a chamber 80 which is to receive a resilient valve seat assembly 81. Instead of providing the rigid seat 20 as previously described the assembly 81 is inserted in the chamber 80 and the forward face 63 of the valve as well as the plates 67 are arranged to abut against this assembly 81.

The assembly 81 includes a body of packing material 83 which has a forwardly extending tongue portion 84 thereon. The beveled portions 85 join the tongue with the body 83. Positioned above and below the tongues 84 and the retainer blocks 86 which are of a configuration to fit the tongue, the bevel 81 and the front face of the body 83. These blocks are held against displacement by the set screws 87 and their forward faces are substantially flush with the forward face of the tongue 84. The choke portions 22 may be provided here as previously described.

It seems obvious that the blocks 86 have relative sliding movement so that when pressure is applied to them they will move to the left, as seen in Fig. 5, so as to apply pressure to the packing body 83. In view of the resilient nature of this packing material there will be a tendency for the packing material to flow forward into the tongue 84 and to extrude this packing material in this manner.

It will be seen that the tongue 84 is of such a thickness that it corresponds to the packing body 46 in the valve member and that the plates 67 engage against the blocks 86, so that any pressure applied to the valve member 7 will also be applied to the blocks 86 and in effect a seal is provided the same as though two valve or ram members 7 were abutting each other. In this manner there is a resilient packing member both on the seat and the valve member and this packing is completely confined by the reenforcing plates 67 and the blocks 86. This arrangement provides an enormous amount of surplus packing material to compensate for wear.

Fig. 6 shows a construction similar to that of Fig. 5 except that the recess 80 is closed by a cap plate 90, which is held in position by the cap screws 91. In lieu of set screws 87, however, a shoulder 92 has been provided in the chamber 80 so that the blocks 86 may abut against the shoulder and in this manner be restrained from inward movement beyond a predetermined amount. They are, however, free to move rearwardly or to the left, as seen in the drawings, when pressure is applied to the valve member 7.

What is claimed is:

1. A valve housing, an outstanding seat therein, a valve packing to contact said seat, a valve head to cooperate with said housing and seat to completely confine said packing, and means to apply pressure to said head, said means including a resilient packing.

2. A valve member comprising an assembly of a valve body, a sleeve thereon, a valve head about said sleeve and slidable thereon, a resilient packing between said head and body, and a second resilient packing carried by said head, said packings abutting each other to obtain a uniform distribution of pressure.

3. A packing assembly for valve or ram members, including a body, a hub portion therein, and a bypass through said hub portion.

4. A packing assembly for valve or ram members comprising a body, legs on said body, and a reenforcing tenon in each leg extending into said body.

5. A packing assembly for valve or ram members comprising a body, legs on said body, a reenforcing tenon in each leg extending into said body and a reenforcing stud transversely of said body.

6. A packing assembly for valve or ram members comprising a body, legs on said body, a reenforcing tenon in each leg extending into said body, a reenforcing stud transversely of said body, and a bypass through said body to equalize the pressure on the front and rear of said packing.

7. The combination of a valve housing and seat, a valve member, a sealing face carried by said member to abut said seat, and a bypass extending from said face and through said member to equalize the pressures on said member.

8. A valve including a housing, a vertical passage therethru, a single valve member movable entirely across such passage, a recess in said housing to receive the end of said member, a stationary packing assembly in said recess to provide a seat for the end of said valve member, said assembly including a resilient packing material, rigid means in said recess and carried by said packing, said means being slidable in said recess by pressure from said valve member to displace the packing to seal with said valve member.

HERBERT ALLEN.
JAMES S. ABERCROMBIE.